(12) United States Patent
Blake

(10) Patent No.: US 6,285,390 B1
(45) Date of Patent: Sep. 4, 2001

(54) ROTATABLE MIRROR ASSEMBLY

(75) Inventor: Martin Blake, Hitchin (GB)

(73) Assignee: Fujifilm Electronic Imaging Ltd., Herts (GB)

( * ) Notice: Subject to any disclaimer, the term of this patent is extended or adjusted under 35 U.S.C. 154(b) by 0 days.

(21) Appl. No.: 09/285,279

(22) Filed: Apr. 2, 1999

(30) Foreign Application Priority Data

Apr. 7, 1998 (EP) .................................................. 98302719

(51) Int. Cl.$^7$ ...................................................... B41J 27/00
(52) U.S. Cl. ......................... 347/260; 347/243; 347/245
(58) Field of Search .................................. 347/241, 242, 347/200, 243, 260, 261, 257, 245; 359/819, 811

(56) References Cited

U.S. PATENT DOCUMENTS

| | | | |
|---|---|---|---|
| 4,105,296 | * | 8/1978 | Tomlin ................................. 350/204 |
| 4,571,036 | * | 2/1986 | Gebelein ............................. 350/503 |
| 5,148,313 | * | 9/1992 | Schwemin ........................... 359/555 |
| 5,642,150 | * | 6/1997 | Takahshi .............................. 347/257 |
| 5,739,939 | * | 4/1998 | Merritt ................................. 259/204 |

FOREIGN PATENT DOCUMENTS

| | | |
|---|---|---|
| 195 15 887 A1 | 10/1996 | (DE) . |
| 0 596 301 A1 | 5/1994 | (EP) . |
| 0 814 358 A2 | 12/1997 | (EP) . |

OTHER PUBLICATIONS

Patent Abstracts of Japan, vol. 095, No. 004, May 31, 1995 (JP 07 013094 A).

* cited by examiner

Primary Examiner—N. Le
Assistant Examiner—Lamson Nguyen
(74) Attorney, Agent, or Firm—Sughrue, Mion, Zinn, Macpeak & Seas, PLLC

(57) ABSTRACT

A rotatable mirror assembly comprises a rotatably mounted support (1); and a mirror (7) mounted to the support for rotation therewith. The mirror (7) is mounted at a position (5) laterally offset from the axis (6) of rotation of the support, the mirror being spaced from the remainder of the support to allow the mirror to distort when it is rotated.

10 Claims, 3 Drawing Sheets

ROTATABLE MIRROR ASSEMBLY

FIELD OF THE INVENTION

The invention relates to a rotatable mirror assembly, for example for use in an image exposing device such as an internal drum image setter.

DESCRIPTION OF THE PRIOR ART

In the field of image reproduction, it is common to cause a radiation beam such as a laser beam which has been modulated with image information to scan across a record medium at high speed. This scanning action is achieved by directing the beam onto an angled mirror which is rotated. In order to increase the rate at which a record medium is exposed, it is conventional to rotate the mirror at very high speed, a typical example is 30000 revolutions per minute. At these high rates of rotation, the materials from which the mirror is made can distort with the result that the beam impinging on the record medium suffers from astigmatism and poor spot quality. In general, a focusing lens which focuses the beam onto the record medium, has to be positioned at different locations along the beam to achieve optimum focus in the scanning direction and orthogonal to the scanning direction. The distance between these focusing positions is a measurement of the astigmatism and it is desirable to minimise that distance.

One method of dealing with this problem involved providing a special profile to the mirror so that when the mirror is rotated, it takes up a substantially planar configuration. This suffers from disadvantages, including the fact that the profile can only give the correct compensation at one speed of rotation.

SUMMARY OF THE INVENTION

In accordance with the present invention, a rotatable mirror assembly comprises a rotatably mounted support; and a mirror mounted to the support, for rotation therewith, at a position laterally offset from the axis of rotation of the support, the mirror being spaced from the remainder of the support to allow the mirror to distort when it is rotated.

Instead of attempting to modify the mirror itself, we have devised a new approach in which the mirror is allowed to distort in such a way that relatively little astigmatism is produced. This is achieved by mounting the mirror to the support at a position laterally offset from the axis of rotation of the support. This leaves the front part of the mirror free to distort in such a way that it compensates for the distortion of the top part of the mirror.

Typically, the mirror presents a substantially planar reflective surface when stationary. However, in some cases, a different mirror form may be desired at high speed so the reflective surface will be formed accordingly.

In one preferred arrangement, the support includes a spigot which is fixed in a slot in the mirror so as to mount the mirror to the support. Typically, the spigot will be glued with a suitable adhesive in the slot but other forms of connection such as splines and the like could be used. In a modification of this arrangement, the mirror could include a spigot which is fixed in a slot in the support.

In an alternative arrangement, the support and the mirror are formed integrally with a slot being cut into the front part of the mirror. This can provide a simpler construction in some cases and the assembly will be quieter to operate.

To achieve exactly the compensation required for a particular design, the size and location of the spigot may be varied, or the shape and extent of the cut.

As in conventional mirror assemblies, one or more balance weights may be provided in the support and/or the mirror to ensure smooth rotation.

Typically, the mirror defines a reflective surface which extends at a non-orthogonal angle to the axis of rotation of the support. This is advantageous since a beam to be deflected can be directed towards the mirror along the axis of rotation.

The mirror may define a reflective surface having an elliptical shape in plan but other shapes are also possible.

As mentioned previously, the invention is particularly applicable for use in an image exposing device which further includes a radiation beam source for generating a radiation beam which impinges on the mirror; a record medium support onto which the beam is incident following reflection by the mirror; and a modulator for modulating the beam with image information. An example is a conventional internal drum imagesetter.

BRIEF DESCRIPTION OF THE DRAWINGS

Some examples of mirror assemblies and an imagesetter incorporating such mirror assemblies will now be described with reference to the accompanying drawings, in which.

EMBODIMENT

Figure 1:
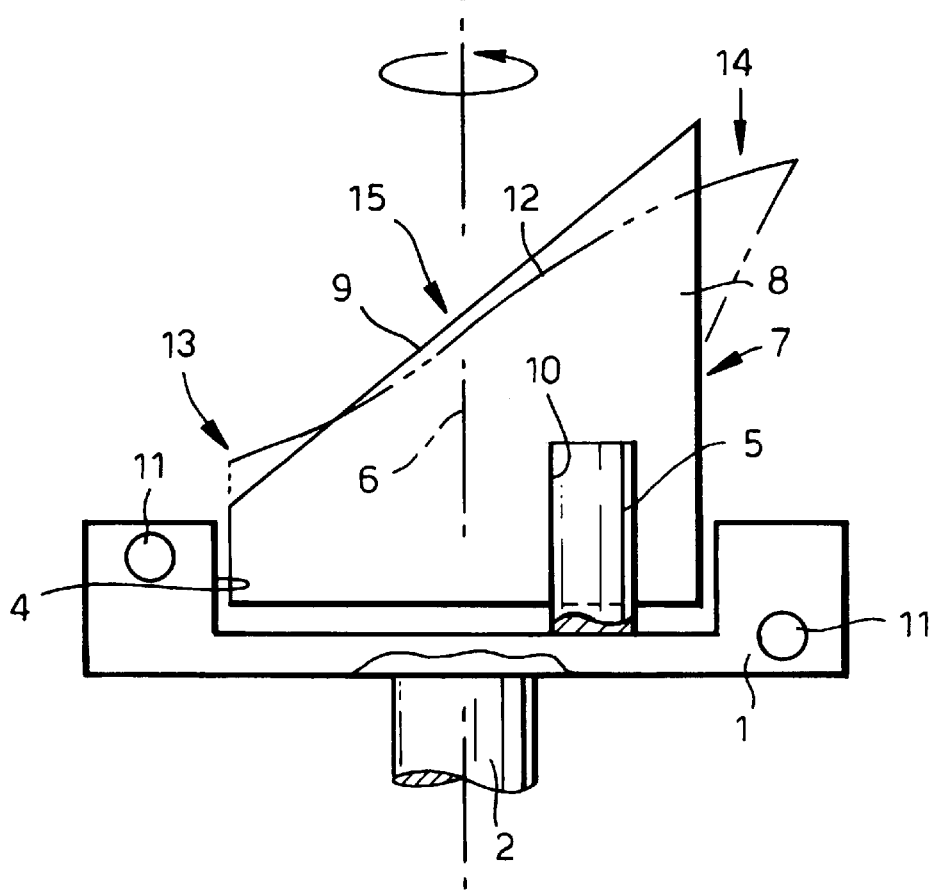
FIG. 1 is a schematic side view of a first example of a mirror assembly.

The mirror assembly shown in FIG. 1 comprises a support 1 including a spindle 2 which is connected to a motor in use and a rim 3 defining a circular cavity 4. Integrally formed with the support 1 is an upstanding spigot 5 laterally offset from an axis 6 of the spindle 2 about which the support 1 is rotated.

Figure 5:
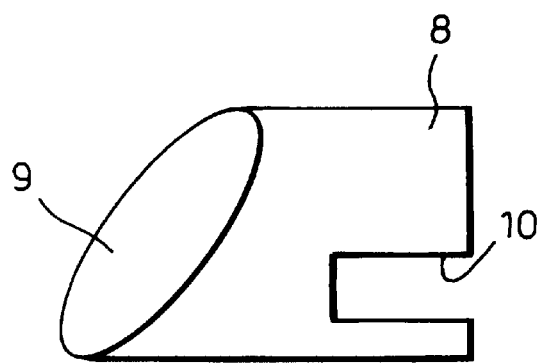

Mounted on the spigot 5 is a mirror 7 having a body 8 defining a reflective surface 9. The form of this surface can be seen more clearly in FIG. 5 where it will be seen that the surface is elliptical and planar. Formed in the base of the body 8 is a slot 10 which receives the spigot 5 so that the mirror 7 can be mounted on the support 1. The spigot 5 is bonded to the mirror body 8 with a suitable adhesive. It will be noted that the mirror 7 is freely supported within the cavity 4 by virtue of its mounting on the spigot 5. There is thus a spacing between the edge of the body 8 and the surrounding cavity.

Typical materials for the support and mirror are aluminium or beryllium and these may be the same for each or different.

To provide additional support, balance weights 11 are located in different parts of the support 1. In addition, or alternatively, balance weights could be included within suitable machined bores (not shown) in the mirror body 8.

The mirror has a typical diameter of 30 mm.

In use, the spindle 2 is rotated at high speed, e.g. 30000 revolutions per minute, and this will cause the reflective surface 9 of the mirror body 8 to distort. However, it has been found that by supporting the mirror body 9 on the spigot 5 laterally offset from the axis 6, this distortion can be minimised at least in the central region of the reflective surface 9 as shown by the dashed line 12 in FIG. 1. The distortion shown in FIG. 1 is grossly exaggerated over the actual distortion. The reason for this appears to be that the region of the mirror body 8 remote from the spigot 5, as indicated at 13, can distort longitudinally in a direction orthogonal to the axis 6 while the region 14 distorts outwardly. This is a different form of distortion to that which occurs when the body 8 is mounted to the support 1 about the axis 6, and results in a substantially planar region 15.

Figure 2:
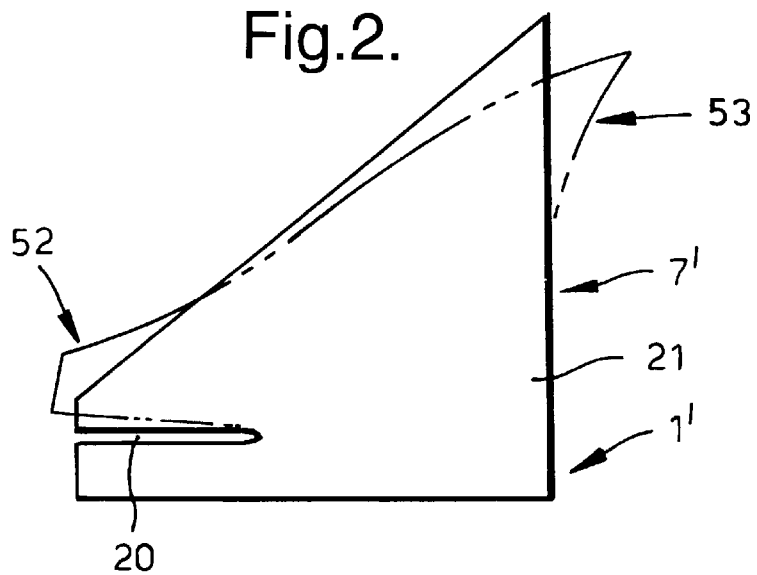
FIG. 2 is a schematic side view of a second example.

A second example is shown in FIG. 2. In this case, the mirror 7' and the support 1' are machined from the same block by machining a groove or slot 20 so as to leave the mirror 7' supported on a leg 21 on the support 1'. Balance weights can be incorporated in the body of the mirror 7' by machining bores 22 through the support 1' into the mirror 7' and then providing balance weights in those bores. In some cases, the FIG. 2 example may be preferred to the FIG. 1 example since there are fewer separate parts and rotation of this assembly is likely to be quieter.

Figure 3A:
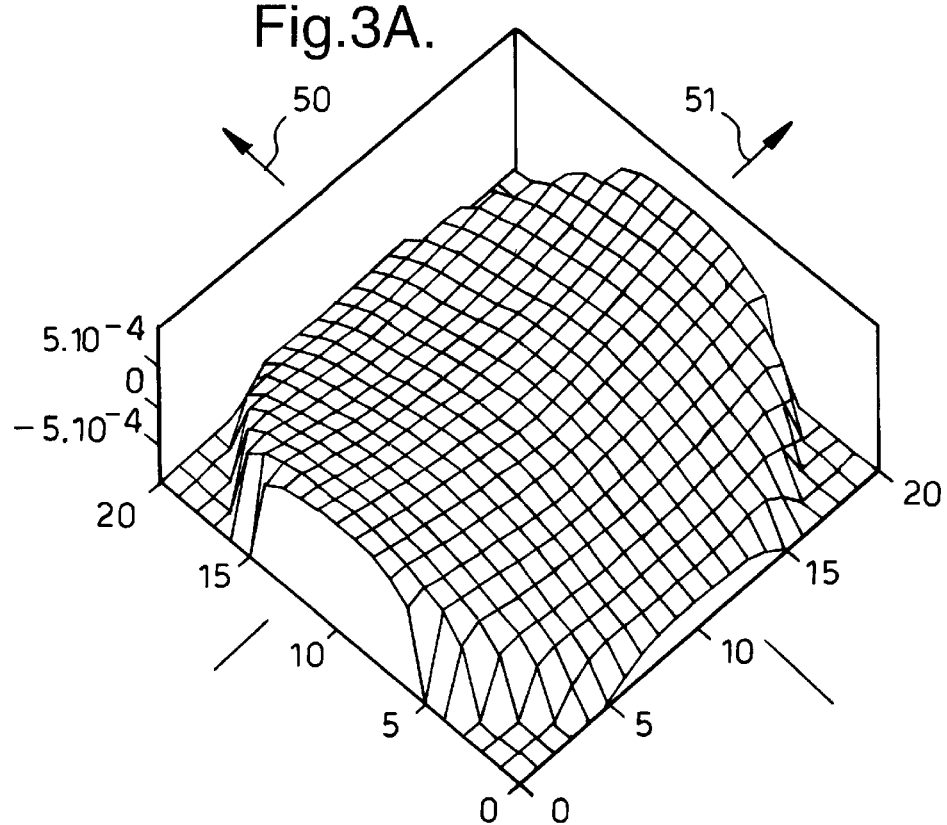
FIGS. 3A and 3B illustrate the appearance of the reflective surface of a conventional mirror assembly and the assembly shown in FIG. 2 respectively when rotating.

FIG. 3A illustrates in greatly exaggerated form the appearance of the reflective surface of a conventionally mounted spinner. The vertical axis is in millimetres while the major axis of the elliptical mirror is shown at 50 and the minor axis at 51. It can be seen that in the direction of the major axis 50, the mirror exhibits a significant convex curvature. There is a concave curvature along the minor axis 51 and it is the differences in the power of the two curvatures which give rise to astigmatism.

Figure 3B:
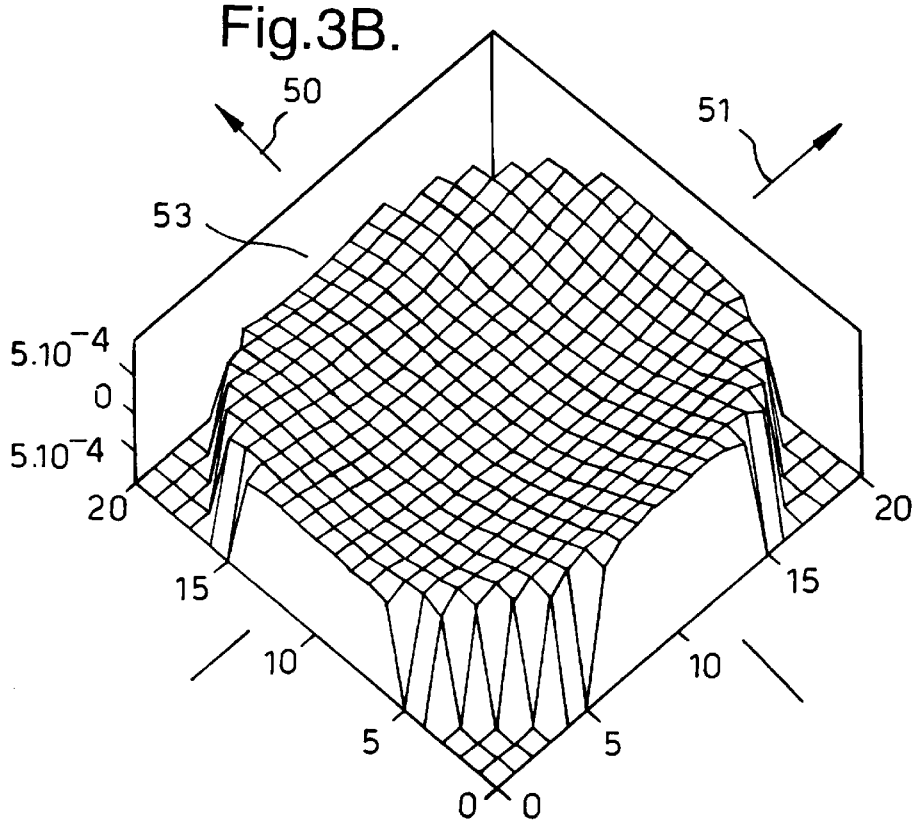

FIG. 3B is similar to FIG. 3A but illustrates the appearance of the reflective surface of the mirror 7' shown in FIG. 2. In this case, it can be seen that the difference in curvature in the two directions 50, 51 is significantly reduced over that shown in FIG. 3A and thus there is a significant reduction in astigmatism. The distortions caused in the mirror 7' at 52, 53 can also be seen in FIG. 3B.

Figure 4:
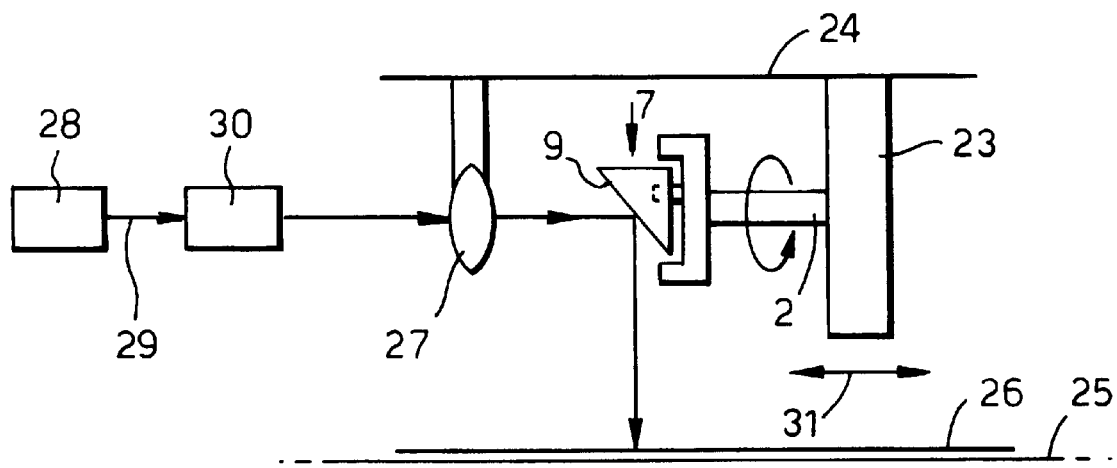
FIG. 4 is a schematic side view of an internal drum imagesetter with several parts removed for clarity; and, FIG. 5 is a perspective view of the mirror shown in FIG. 1.

The mirror assembly can be used in wide variety of applications in which beams are to be scanned. In one preferred example, the assembly is incorporated into an internal drum image setter of the type shown in FIG. 4. FIG. 4 illustrates an assembly of the kind shown in FIG. 1 in which the support spindle 2 is mounted to a motor 23 mounted to a base 24. These components are located within a drum shown schematically at 25 which will extend circumferentially around all the components. A record medium such as a film 26 is mounted on the internal surface of the drum 25. The base 24 also carries a focusing lens 27.

A laser 28 is located at a distance from the drum 25 and generates a laser beam 29 which is fed to a modulator 30 which modulates the beam in accordance with image information in a conventional manner. The beam is then directed to the focusing lens 27 which focuses the beam onto the record medium 26. The beam is directed from the focusing lens 27 onto the reflecting surface 9 of the mirror 7 and is reflected onto the film 26. Typically, the beam will have width of 20–30 millimetres when it impinges on the reflecting surface 9 and will focused down to a few microns on the film 26.

The motor 23 rotates the spindle 2 which causes the beam 29 to scan circumferentially along the film 26. At the same time, relative movement is caused between the base 24 and the drum 25 as shown by arrows 31 so that the beam is scanned successively along separate scan lines in the longitudinal direction.

I claim:

1. A rotatable mirror assembly comprising a rotatably mounted support; and a mirror mounted to the support, for rotation therewith; said mirror being mounted to said support at a position laterally offset from and asymmetrically with repect to the axis of rotation of the support, the mirror being spaced from a remainder of the support to allow the mirror to distort when it is rotated.

2. An assembly according to claim 1, wherein the mirror presents a substantially planar reflective surface when stationary.

3. An assembly according to claim 1, wherein the support includes a spigot which is fixed in a slot in the mirror so as to mount the mirror to the support.

4. An assembly according to claim 1, wherein the support and the mirror are formed integrally.

5. An assembly according to claim 1, wherein one of the support or the mirror includes at least one balance weight.

6. An assembly according to claim 1, wherein the mirror defines a reflective surface which extends at a non-orthogonal angle to the axis of rotation of the support.

7. An assembly according to claim 1, wherein the mirror defines a reflective surface having an elliptical shape in plan.

8. An assembly according to claim 1, wherein the mirror and support are made of the same material.

9. An assembly according to claim 1, wherein the mirror is made of beryllium or aluminium.

10. An image exposing device comprising: a rotatable mirror assembly, said rotatable mirror assembly comprising a rotatably mounted support, and a mirror mounted to the support, for rotation therewith; said mirror being mounted to said support at a position laterally offset from and asymmetrically with respect to the axis of rotation of the support, the mirror being spaced from a remainder of the support to allow the mirror to distort when it is rotated; said image exposing device further comprising: a radiation beam source for generating a radiation beam which impinges on the mirror; a record medium support onto which the beam is incident following reflection by the mirror; and a modulator for modulating the beam with image information.

* * * * *